United States Patent [19]
Hindman

[11] Patent Number: 6,088,384
[45] Date of Patent: Jul. 11, 2000

[54] IF-DELAY NARROW CORRELATION TRACKING

[75] Inventor: David L. Hindman, Austin, Tex.

[73] Assignee: Starlink, Inc., Austin, Tex.

[21] Appl. No.: 08/951,721

[22] Filed: Oct. 16, 1997

[51] Int. Cl.[7] .............................. H04B 15/00; H03D 1/00
[52] U.S. Cl. ................................ 375/208; 375/343
[58] Field of Search ................................ 375/343, 316, 375/208, 209; 324/76.39; 342/89; 343/13 R; 455/3.2; 708/422, 426

[56] References Cited

U.S. PATENT DOCUMENTS

| | | | |
|---|---|---|---|
| 3,806,808 | 4/1974 | Willmore | 324/76.39 |
| 4,053,888 | 10/1977 | Robin et al. | 342/89 |
| 5,220,580 | 6/1993 | Heberle et al. | 375/200 |
| 5,390,207 | 2/1995 | Fenton et al. | 375/209 |
| 5,600,670 | 2/1997 | Turney | 375/208 |
| 5,809,064 | 9/1998 | Fenton et al. | 375/208 |

*Primary Examiner*—Chi H. Pham
*Assistant Examiner*—Khai Tran
*Attorney, Agent, or Firm*—Patrick Stellitano; Fulbright & Jaworski L.L.P.

[57] ABSTRACT

A narrow correlation system is provided for narrow correlation tracking by fixed or dynamic delay of a received encoded signal and correlating the encoded signal and the delayed encoded signal with identical PRN code sequences with coincident epochs to produce early and late correlations separated by substantially less than one code chip, and with multiple correlation points obtained by implementing multiple delays of the encoded signal and separately correlating each different one of the delayed encoded signals with the same PRN code to produce a weighted tracking error signal.

34 Claims, 6 Drawing Sheets

IF-DELAY NARROW CORRELATION TRACKING

TECHNICAL FIELD

The present invention relates to methods and apparatus for achieving narrow correlation spacing in a spread spectrum receiver.

BACKGROUND OF THE INVENTION

Spread spectrum systems, wherein signals are encoded with pseudorandom noise codes, transmitted, and then decoded upon reception, are used in a variety of applications. In particular, the Global Positioning System (GPS) is a spread spectrum radio navigation system comprised of a constellation of earth-orbiting satellites that transmit information bearing signals from which a GPS receiver may derive accurate navigation and timing data. Each satellite signal is encoded with a distinct pseudorandom noise (PRN) code which must be decoded or "despread" by the GPS receiver to extract the useful information from the signal.

A GPS receiver typically contains multiple correlator channels for despreading the signals of multiple satellites. Each channel is functionally identical and all of the channels are controlled by a microprocessor. A GPS correlator channel comprises a code generator for generating a PRN code, a digitally controlled oscillator (code DCO) for controlling the timing characteristics of the code generator, code mixers for mixing the incoming signal with the PRN code and accumulators for integrating the output of the code mixers. The duration of the PRN code sequence, called the epoch, and the rate at which the PRN code bits are generated, called the chipping rate, are controlled by the code DCO. In particular, the epoch of the C/A code, which is a type of PRN code typically used in GPS receivers, is one millisecond, and the chipping rate is 1.023 MHz. Thus, the duration of a code bit is about 0.9775 microseconds.

The correlation process comprises mixing the incoming encoded signal with the code generated in the correlator channel by the code generator and accumulating the result over the duration of an epoch. At the end of the epoch, the accumulation is dumped to output the result. This accumulate and dump process occurs over each epoch. Epoch accumulations are then combined to form data bit detection intervals, enabling the data stream to be recovered by a data detector.

The code generator is capable of generating any one of a series of sequences which have the property that the correlation of any two sequences that are not the same produces a very low correlation value, whereas the correlation of any two identical sequences produces a correlation value proportional to the time delay between the two identical sequences. Thus, the correlation of two identical sequences is a relatively high value when there is no time delay between them. The correlation value falls to a relatively low value rapidly as the time delay between the identical sequences increases. In contrast, correlation of two different code sequences is always a relatively low value.

If a sequence impressed on an information bearing signal is the same sequence generated by the code generator, and if the time delay between the sequences is very small, the output signal from the correlator at the end of each epoch will be nearly equal to the average value of the information bearing signal during the epoch in which the correlation occurred. If this condition is maintained, the correlation process will reconstruct the signal information and the PRN code will be removed from the signal. Conversely, if the sequence impressed on the incoming signal is not the same sequence generated by the code generator, or if a significant delay between the sequences exists, the output from the correlator will be nearly zero and the signal information will be lost.

The purpose of the correlation process, which is called de-spreading, is to remove the PRN code from the incoming signal and to differentiate between the signal from one satellite and the signals from all the other satellites. Each channel of the GPS receiver used to receive satellite information receives a composite signal comprised of the transmissions from many satellites. However, each satellite transmits a different PRN code. By correlating the composite signal with a code sequence that replicates the code sequence transmitted by a particular satellite, a correlator channel is able to select the signal of one satellite and reject all others. Since each channel contains its own code generator and code DCO, each channel can process the signal from a different satellite.

Therefore, the code generator of each correlator channel used to despread a satellite signal is commanded by the GPS microprocessor to generate the particular code sequence corresponding to the satellite to be tracked by that channel. The code DCO controls the chipping rate so as to cause the generated code to have the same frequency as the received code.

As previously noted, when there is no time delay between the received code and an identical code generated by the code generator, the output of the correlation process is a peak value. If, however, a change in frequency or phase of the received signal occurs—which may be caused by receiver motion, clock offset, or satellite motion—the correlation output will decrease to a smaller value. When this occurs, the code DCO must be adjusted to maintain synchronization between the received code and the generated code. This can be accomplished by means of an Early/Late Correlation tracking loop, in which the correlation peak is gated by generating early and late correlation signals. This is done by correlating the received code with an identical code that is slightly delayed in time with respect to the received code, (a late code), to create a late correlation, and also correlating the received code with an identical code that is slightly advanced in time with respect to the received code, (an early code), to create an early correlation. The delay between the early and late codes is referred to as the correlation spacing or gate width.

The early and late correlations are processed by a discriminator that develops a tracking error signal indicative of the position of the received code phase with respect to the code phase of the early and late code generated by the correlator. A commonly used discriminator function from which the tracking error signal may be derived is the difference between the squares of the complex magnitudes of the early correlation and late correlation. The tracking error signal may in turn be used to determine the adjustment to be made to maintain the received code in the gate. The discriminator function is typically implemented in the GPS receiver microprocessor operating under the directions of software, which adjusts the code DCO in response to the tracking error signal.

Thus, if the received code begins to advance in phase, the early correlation power level will increase and the late correlation power level will decrease, indicating that the phase of the generated code, as controlled by the code DCO, must be advanced. Conversely, if the received code begins to retard in phase, the late correlation power level will rise and the early correlation power level will decrease, indicating that the phase of the generated code must be retarded.

Tracking a desired signal by gating it is well known in the art and has been used for years in radar acquisition and tracking systems.

The current method used in GPS receivers for satellite signal tracking is to generate early and late PRN codes, and to correlate these separately with the received signal. Another commonly used tracking method is implemented by correlating the received signal with a prompt code and with a code formed by subtracting the late PRN code from the early PRN code (Early Minus Late tracking). In either case, the correlator spacing (gate width) is controlled by circuitry within the correlator channel. Unfortunately, commercially available GPS correlator channels do not provide external control of the correlator spacing which is a significant disadvantage to designers of GPS instrumentation. A typical commercially available GPS correlator provides a fixed correlator spacing equal to one code chip which cannot be adjusted. For example, the GEC Plessey GP2021 twelve channel correlator provides a fixed correlator spacing of one chip between early and late codes or of one-half chip between prompt and late codes or prompt and early codes. For more accurate tracking, a much narrower spacing is desired, as such reduces the range of ambiguity in the determination of the integer cycle component of the phase of the received signal. In a differential GPS receiver, this ambiguity may significantly degrade the precision of the navigation solution. Therefore, a need exists for a method and apparatus for achieving narrow correlator spacing using commercially available correlator devices. Moreover, existing multi-channel correlator devices provide early and late codes for each channel, resulting in unnecessary duplication of circuitry, which can be avoided by the method of the present invention herein disclosed.

SUMMARY OF THE INVENTION

The object of the present invention is to provide a method and apparatus for narrow correlation tracking which can be implemented using commercially available correlator devices and which allows the designer to achieve any correlation spacing desired. Another object of the present invention is to provide a method for narrow correlation tracking which can substantially eliminate existing code delay circuitry. Yet another object of the present invention is to provide a method for producing multiple point correlations.

According to the present invention, the intermediate frequency (IF) GPS signal is received from a down-converter section and is input to a first correlator. The IF signal is also delayed and this delayed IF signal is input into a second correlator. The duration of the delay is the desired correlation spacing. Each one of the two correlator channels to be used to track the signal from a particular satellite are synchronized to produce identical sequences with substantially coincident epochs. In an alternative embodiment, the first and second correlators are provided with the same code generated from a single code generator.

Gating is achieved when the code phase of the IF signal input to the first correlator channel leads the phase of the code generated in the first correlator channel and the code phase of the IF signal input to the second correlator channel lags the phase of the code generated in the second correlator channel. When this occurs, the first correlator channel produces an early correlation and the second correlator channel produces a late correlation.

The early and late correlations are processed by a discriminator that develops a tracking error signal indicative of the position of the generated code phase with respect to the code phase of the IF signal and the delayed IF signal. The tracking error signal may in turn be used to determine the adjustment to be made to maintain the generated code in the IF-delay correlation gate.

The IF delay, and thus, the correlation spacing, may be designed to be any fixed value. Alternatively, the delay may be designed to be adjustable to provide adjustable correlation spacing. Moreover, using commercially available correlators which provide a fixed wide correlation gate, the system of the present invention provides a wide and narrow correlation gate simultaneously. The present invention thus enables a GPS receiver comprising commercial correlator components to acquire the received code using a narrow gate or a wide gate, and to subsequently use a narrow gate for tracking, even though adjustment of the delay between early and late codes is not enabled by the correlator components.

According to another aspect of the present invention, an adjustable delay may be provided in the IF signal path to the first correlator as well as the second correlator. This allows the position of the IF-delay correlation gate to be adjusted with respect to the phase of the generated code.

According to yet another aspect of the present invention, the IF signal is input to a cascade of delay devices, and the output of each delay device is input to a different correlator channel to provide multiple-point correlation tracking. This allows for development of a weighted tracking error signal to compensate for adverse multipath effects.

Thus, the GPS receiver designer can implement the present invention to achieve static or dynamically adjustable narrow correlation tracking and multiple-point correlation tracking using existing off-the-shelf components. The present invention therefore provides GPS designers maximum flexibility in the design of GPS receivers. The present invention further provides a tracking system which eliminates the need for duplicative code delay circuitry in each correlator channel.

Although the present invention is described in relation to GPS receivers, it will be understood and appreciated that the invention described herein may be used in other spread spectrum applications.

These and other features, aspects and advantages of the present invention will become better understood with reference to the following description, appended claims and drawings.

DETAILED DESCRIPTION OF PREFERRED EMBODIMENTS

Figure 1:
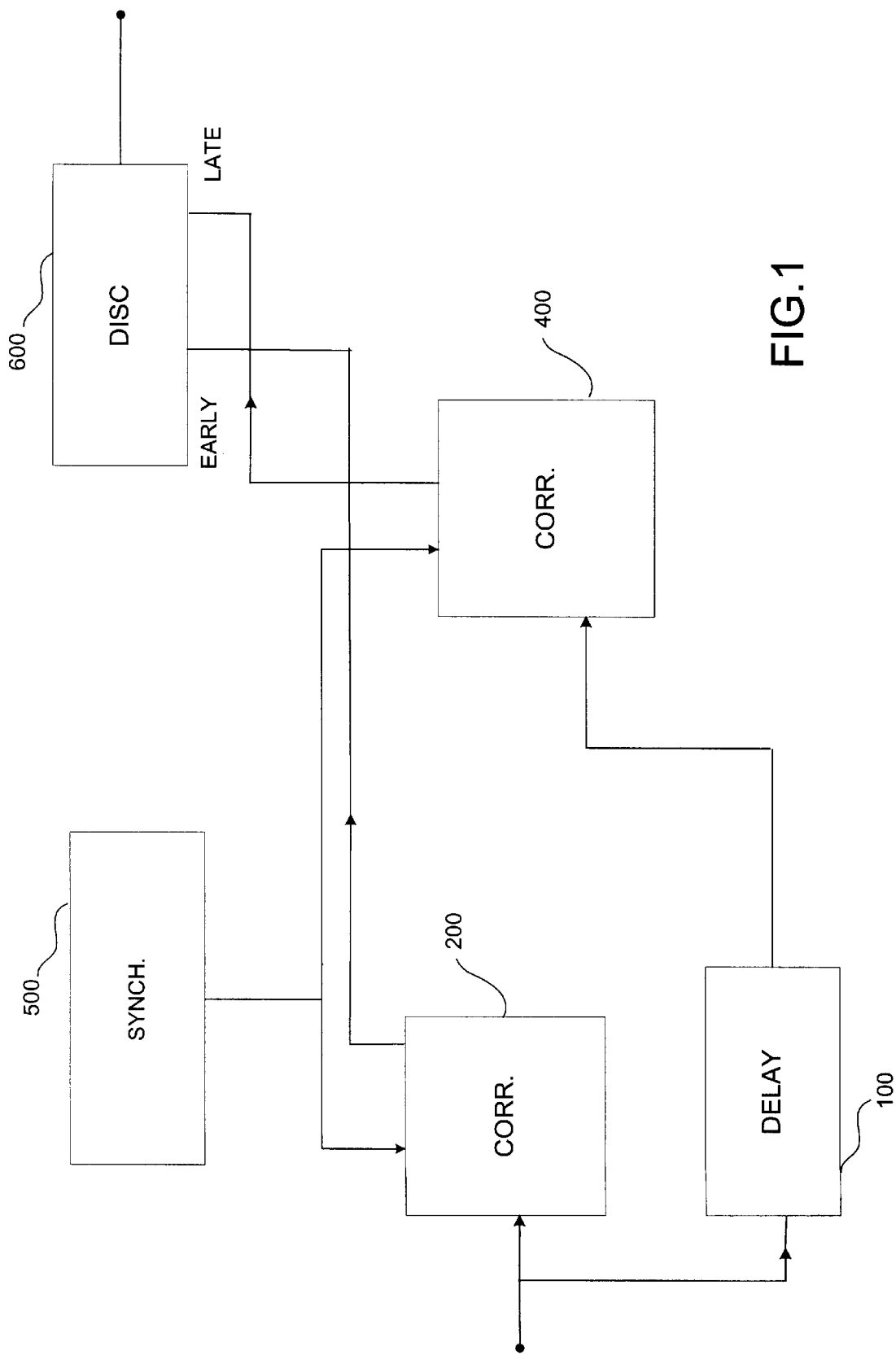
FIG. 1 is a block diagram of an embodiment of the present invention.

A simple block diagram of one embodiment of the present invention is shown in FIG. 1. An IF signal encoded with a PRN code is received by a first correlator 200. The IF signal is also delayed by delay device 100 to produce a delayed IF signal. The delayed IF signal produced by delay device 100 is received by a second correlator 400.

The delay introduced by delay device 100 may be fixed or dynamically adjustable to the desired correlator spacing. For narrow correlation tracking, the delay will be substantially less than one code chip. Various means for implementing delay device 100 will be readily recognizable by persons of ordinary skill in the art. For example, with a digital IF signal, a common D-type flip flop, wherein the delay is controlled by clocking the device at the desired time interval, could be employed.

Figure 2:
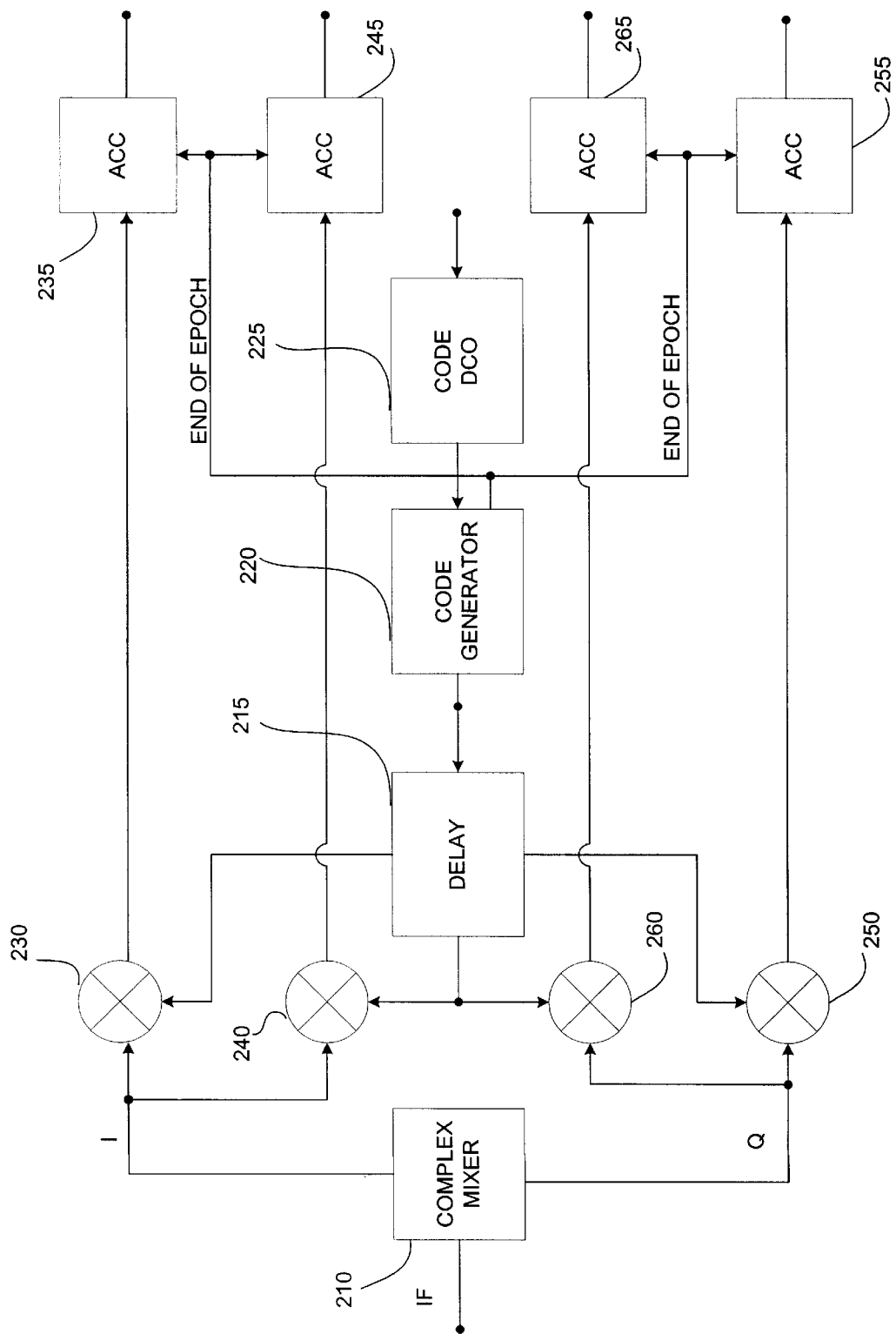
FIG. 2 is a functional block diagram of a typical commercially available correlator channel.

Each of correlators 200 and 400 may be a single-channel correlator or a package of multiple correlator channels. Multi-channel correlators are typically provided in an integrated circuit package. For example, the aforementioned GEC Plessey GP2021 is a twelve channel correlator. It will be assumed herein that correlator 200 is a multi-channel correlator and that correlator 400 is a multi-channel correlator, as it will be clear that the principles of the invention described herein apply equally to single-channel correlators Each correlator channel in a multi-channel correlator is functionally identical. Shown in FIG. 2 is a functional block diagram of a typical correlator channel of a commercially available GPS correlator. A correlator channel typically comprises a complex mixer 210, delay circuitry 215, a code generator 220 for generating a PRN code, a code DCO 225 for controlling the timing of the code generator, code mixers 230, 240, 250 and 260 for producing early and late correlations, and accumulators 235, 245, 255, and 265 for accumulating the early and late correlations. The principles of operation of a correlator channel are well understood by persons of ordinary skill in the art and thus, will be only summarized here.

An IF signal is complex mixed by complex mixer 210 to produce in phase and quadrature phase signals at baseband, (I and Q signals). The I and Q signals are correlated with early and late codes (or a prompt code and an early-minus-late code) to produce early and late correlations (or prompt and early-minus-late correlations) which are accumulated over each epoch. An epoch timing signal causes each accumulator to dump an accumulation at the end of each epoch. In the early/late mode of operation, delay circuitry 215 produces a late code input to mixers 240 and 260 to produce late I and Q correlations. Delay circuitry 215 also produces an early code input to code mixers 230 and 250 to produce early I and Q correlations. In the prompt/early-late mode of operation, delay circuitry 215 would produce a prompt code input to mixers 240 and 260 to produce prompt I and Q correlations. Delay circuitry 215 would also produce an early-minus-late code input to mixers 230 and 250 to produce early-minus-late I and Q correlations.

Returning to FIG. 1, the IF signal is received by each channel of correlator 200 and is separately correlated with the code generated by the code generator within each channel of correlator 200. Similarly, the delayed IF signal is received by each channel of correlator 400 and is separately correlated with the code generated within each channel of correlator 400. For each channel of correlator 200 that is selected for IF-delay correlation tracking as described herein, there is selected a corresponding channel in correlator 400, such that each corresponding channel is commanded to generate identical PRN codes substantially coincident in time. In an alternative configuration, a single code generator and code DCO would provide the same PRN code to corresponding channels, as will be discussed below.

Gating is achieved when the code phase of the IF signal input to correlator 200 leads the phase of the code generated in a channel of correlator 200 and the code phase of the delayed IF signal input to correlator 400 lags the phase of the code generated in a corresponding channel of correlator 400. In this configuration, correlator 200 produces an early correlation and correlator 400 produces a late correlation. Therefore, the IF signal input to correlator 200 can be viewed as an early IF signal (with respect to the phase of the generated code) and the delayed IF signal input to correlator 400 can be viewed as a late IF signal. The early and late correlations are processed by a discriminator 600 to develop a tracking error signal used to maintain synchronization between the generated code and the received code.

The early and late IF signals must be correlated with the identical PRN code sequences with substantially coincident epochs to maintain a constant correlation spacing. To achieve substantially coincident epochs, the codes sequences in each channel must have substantially the same chipping rate and substantially the same epoch start times.

Using separately packaged correlators, synchronization must be provided to ensure that the codes generated within corresponding channels are synchronized. For each channel of correlator 200 that is selected for IF-delay correlation tracking as described herein, there is selected a corresponding channel in correlator 400, such that a synchronizer 500 commands pairs of corresponding channels to generate the same PRN code.

Functions of synchronizer 500 described herein may, of course, be performed by the GPS receiver microprocessor operating under the direction of software. More explicitly, the GPS receiver processor in virtually any GPS receiver will command each correlator channel to generate a PRN code corresponding to the PRN code transmitted by the satellite to be tracked by that channel. The GPS receiver processor can be, therefore, modified to cause a pair of correlator channels to generate the same PRN code as transmitted by the satellite to be tracked by the pair. Modification of the GPS receiver processor software instructions to cause pairs of correlator channels to generate identical PRN codes may readily be achieved by persons of ordinary skill in the art.

Synchronizer 500 also comprises means to synchronize correlators 200 and 400 to ensure that the identical code sequences are generated at substantially the same rate with substantially coincident epochs, (i.e., identical sequences generated at substantially the same frequency and with substantially identical epoch start times), so that constant correlator spacing is maintained.

The particular implementation of synchronizer 500 to synchronize the correlators depends upon what circuitry internal to the correlators is externally accessible. Synchronization can be achieved if the correlators can be operated in a "master-slave" arrangement, wherein the internal timing signals of the "master" correlator are distributed to the "slave" correlator and the correlators are commanded into synchronization. Also, synchronization can sometimes be achieved simply by operating multiple digital devices from the same external clocks, starting the devices simultaneously, and applying identical control signals to all of the devices to be synchronized. For example, this method is recommended by Intel Corporation for synchronizing a 386 microprocessor with an external 387 coprocessor. However, this method, referred to herein as Same Clock- Same Control (SCSC) synchronization, may fail to synchronize devices with certain non-controllable internal state variables.

Such is the case for the GP2021 in which the external 40 MHz clock is divided by an internal clock divider with a non-controllable initial state. Normally, two GP2021 correlator devices subject to SCSC synchronization will achieve synchronization at the first attempt to synchronize them. If synchronization fails, however, it is possible to detect the failure and repeat the synchronization procedure as will now be described.

Figure 3:
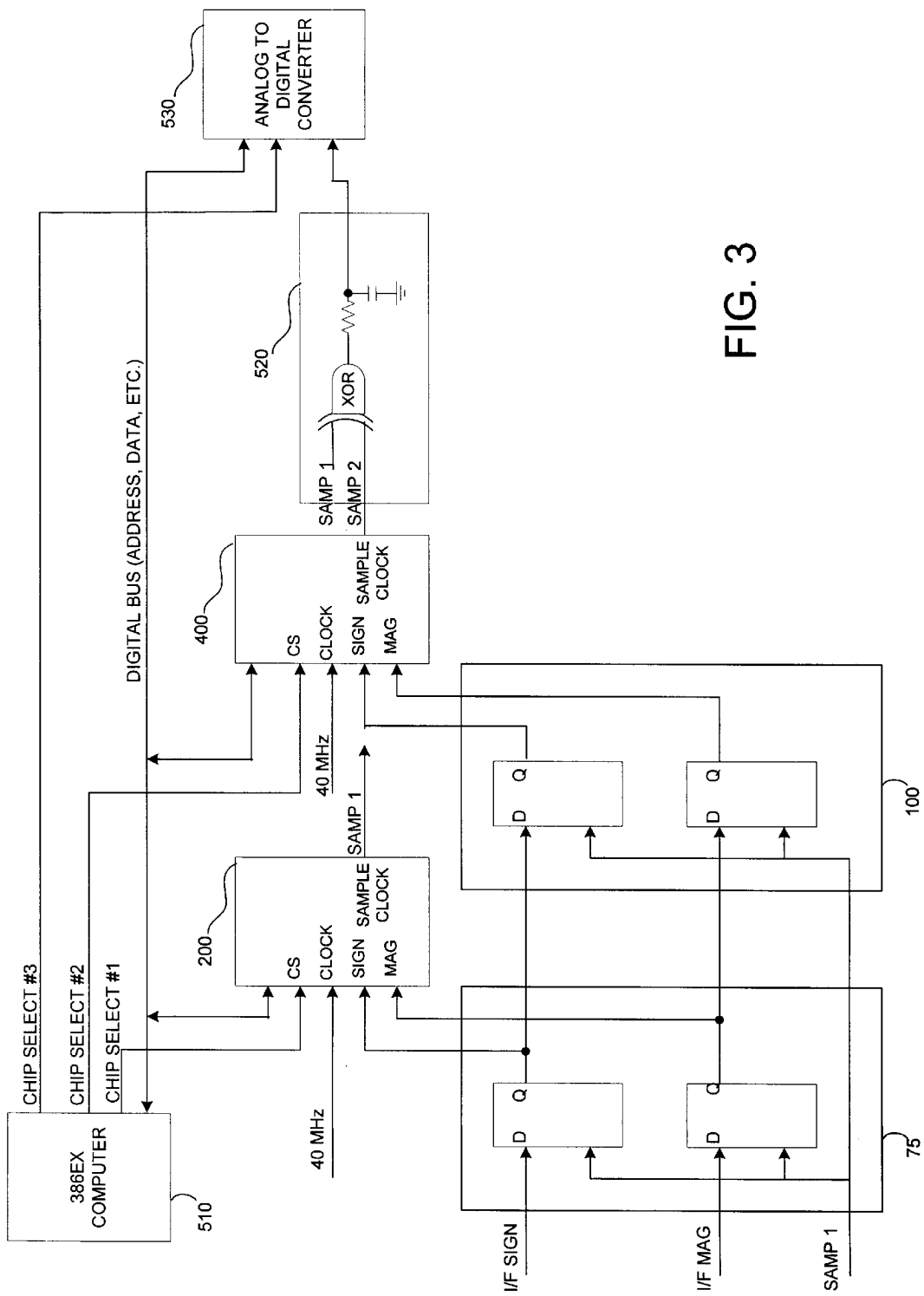
FIG. 3 is a schematic of a preferred embodiment of the present invention using commercially available components.

FIG. 3 shows correlators 200 and 400 connected in an IF-delay correlation gating arrangement, connected to a common clock, operating under the control of a processor 510. Processor 510 is preferably the GPS receiver microprocessor. In a preferred embodiment, processor 510 comprises an Intel 386EX with compatible memory and interface circuitry. Processor 510 must be capable of sending identical commands to several peripheral devices simultaneously, by activating all the appropriate chip select signals in the same bus write cycle. The Intel 386EX has this capability.

At system startup time, processor 510 commands correlators 200 and 400 to reset to identical states, except for the phases of the clock dividers internal to correlators 200 and 400, which phases cannot be externally reset. A failure to synchronize at startup, if such occurs, will be detected by synchronization detector 520. Synchronization detector 520 can be simply implemented as an exclusive or-gate which outputs a logic high only if the sample clock signals, which are externally accessible, of each of correlators 200 and 400 are not coincident in time. If the sample clock signals are coincident, then synchronization is achieved. The output of synchronization detector 520 is input to processor 510 by way of analog-to-digital converter 530. Processor 510, repeats the synchronization procedure if necessary, until synchronization is detected. This synchronization method is simple, effective and involves a minimum of additional circuitry.

Once the correlators 200 and 400 are synchronized, they will remain so as long as they simultaneously receive identical control commands, which is ensured by processor 510. Thus, in this embodiment the functions of synchronizer 500 are performed by processor 510 and synchronization detector 520. The GPS receiver processor may readily be adapted to implement the synchronization functions of processor 510.

Figure 4:
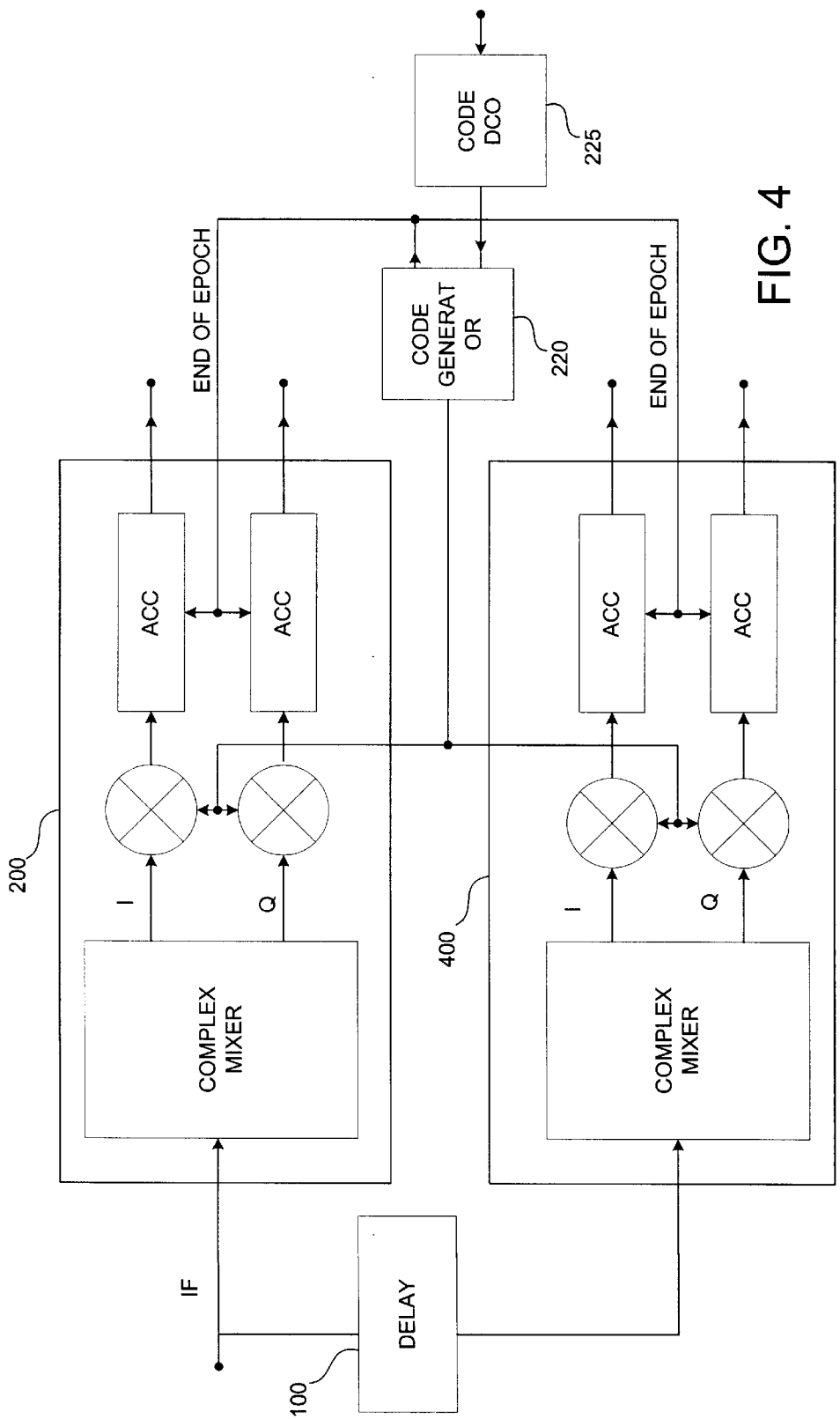
FIG. 4 is a block diagram of an alternative embodiment of the present invention for providing pairs of correlator channels with a PRN code from the same code generator.

An alternative to the synchronization approach just described is to provide a pair of correlator channels with the same PRN code generated by a single code generator, as shown in FIG. 4. Both correlator channels receive the same PRN code and therefore synchronization of two separately generated codes is unnecessary. Using this approach, a single integrated circuit could be manufactured containing multiple pairs of correlators, one code generator and code DCO provided for each pair, thereby eliminating the need for synchronization of multiple separately packaged correlator devices. This approach would also avoid the unnecessary duplication of code delay circuitry for each channel, since the early and late correlations are provided by the IF delay. However, means for economically manufacturing such integrated circuits is beyond reach for many GPS designers. Thus, the use of currently available correlator components provides an attractive alternative for practicing the present invention. Thus, when reference is made herein to codes separately generated in corresponding channels of separately packaged correlators it will be understood that the principles of the invention will apply to this alternate configuration wherein a single generated code is applied to both channels.

Returning to FIG. 3, the two synchronized correlators 200 and 400 receive the identical IF signal except that a time delay is introduced into the path of the signal to correlator 400 by delay device 100. Delay device 100 is depicted as D-type flip flops. Note that a second delay device 75, also comprised of D-type flip flops, introduces a delay to both signal paths to correlators 200 and 400, and that both delay devices 75 and 100 are clocked by the same sample clock, which may be obtained from one of correlators 200 or 400. Conveniently, delay device 75 is actually contained within a companion GEC Plessey GPS down-converter integrated circuit which provides the sampled and quantized IF signal. This configuration causes both the IF signal and the delayed IF signal to be latched simultaneously with a delay of one sample clock period between them. The normal sample clock frequency of a GP2021 is 5.71 MHz. Thus, the delay introduced is about 175 nanoseconds, or 0.179 of a C/A code chip. This is a much more desirable narrow correlation spacing than the one or one-half chip spacing provided by the GP2021.

Returning to FIG. 1, the early and late correlations are processed by discriminator 600. Discriminator 600 develops a tracking error signal indicative of the position of the generated code phase with respect to the code phase of the IF signal and the delayed IF signal. A discriminator function from which the tracking error signal may be derived is the difference between the squares of the complex magnitudes of the early correlation and late correlation. The tracking error signal may in turn be used to determine the adjustment to be made to maintain the generated code in the IF-delay correlation gate.

In a conventional GPS receiver, the GPS receiver microprocessor will ordinarily perform the discriminator functions of discriminator 600 and maintain code tracking by adjusting the code DCO to maintain the code phase of the received code between the code phase of the generated early and late codes. In the present invention the GPS receiver processor will adjust the code DCO of corresponding pairs of correlator channels to maintain the generated code phase between the code phases of the IF signals received by the corresponding channels. Thus, discriminator 600 may be implemented in the GPS receiver processor operating under the direction of software instructions which may readily be developed by persons of ordinary skill in the art.

Clearly, delay device 100 could be implemented as an adjustable delay device to provide variable correlator spacing. Means for implementing an adjustable delay device would be readily recognizable by persons with ordinary skill in the art. For example, the delay device 100 may be clocked by a clock of any desired period to achieve any desired delay. Alternatively, an adjustable delay device could be implemented by a sequence of flip flops, the output of any one of which is selectively electrically connected to correlator 400 by appropriate logic circuitry or by an analog delay line.

Figure 5:
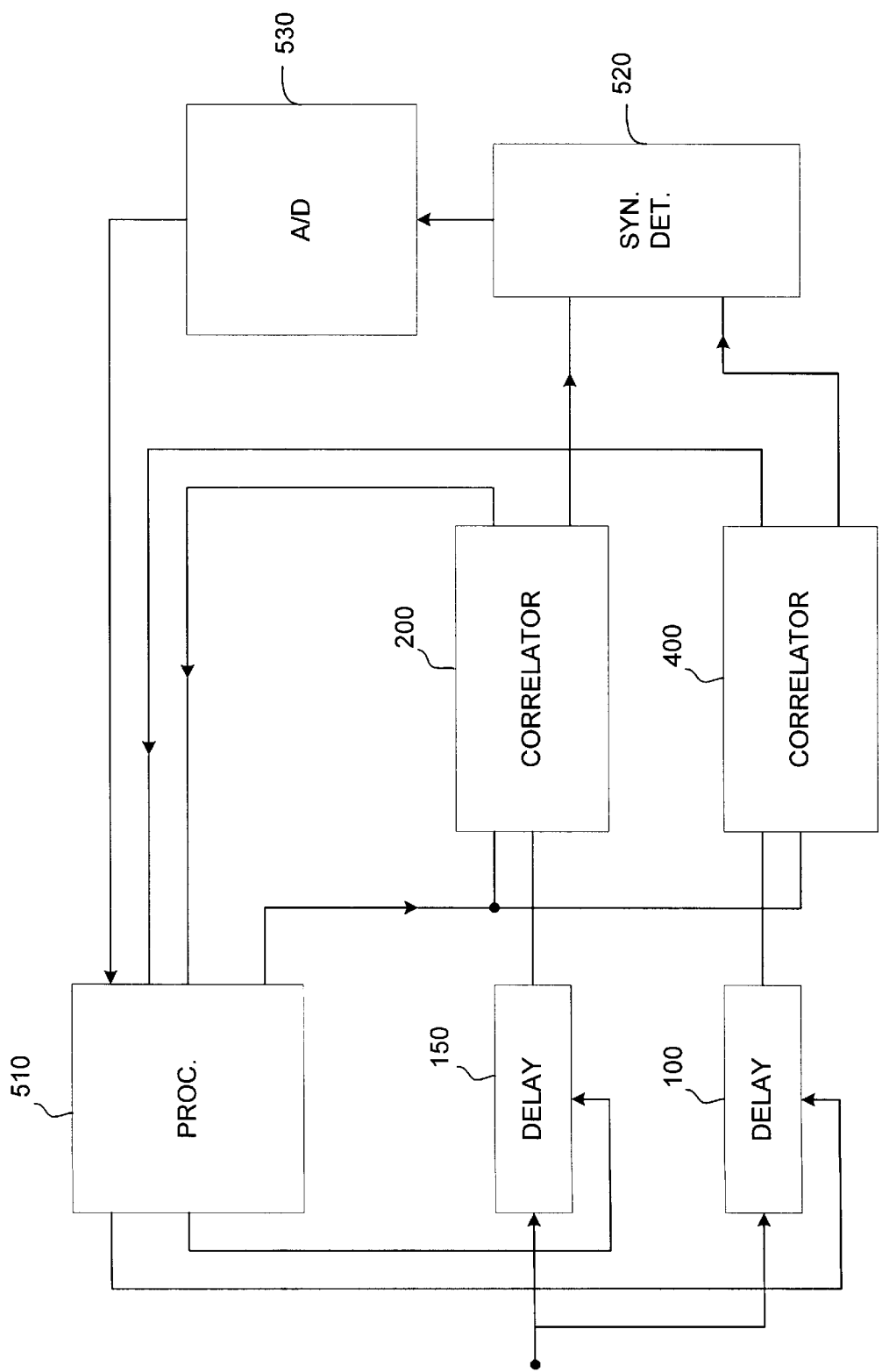
FIG. 5 is a block diagram of an alternative embodiment of the present invention for providing dynamically adjustable correlation gating.

Adjustable delay would allow a GPS receiver constructed with commercially available components to operate in a wide gate acquisition mode followed by a narrow gate tracking mode. Quite simply, in the acquisition mode a relatively large delay is selected, corresponding to a wide correlation spacing, typically of about one code chip or greater. Once the generated code is acquired in the wide gate, as indicated by the early and late correlation power levels, the delay is reduced to achieve the narrow desired correlation spacing to track the generated code. Preferably, the adjustable delay would be controlled by the GPS microprocessor operating under the directions of software, which would control the delay device. This is shown in FIG. 5, where processor 510 is the GPS receiver microprocessor implemented to also perform synchronization functions of synchronizer 500 and the discriminator functions of discriminator 600, as described above.

However, in the present invention, it is not necessary for the delay provided by delay device 100 to be dynamically adjustable to have wide gate acquisition and narrow gate tracking. In the present invention, when commercially available correlators are used, both a wide gate and a narrower gate are present simultaneously. This is so, because commercially available correlators will produce early and late correlations from early and late codes delayed by one code chip to provide a one code chip correlator spacing. Thus, correlator 200 provides a one chip wide gate as does correlator 400. Thus, the gate provided by correlator 200 or 400 can be used if desired as a wide gate for acquisition and a fixed narrow gate provided by IF delay device 100 can be used for narrow gate tracking.

In a conventional receiver configuration, the generated code is typically adjusted in frequency until the received code is gated between the early code and the late code, as indicated by the early and late correlation power levels. This can be accomplished in the present invention using the one-chip wide gate of correlator 200 or 400 in the conventional manner or by adjustable IF-delay of about one chip or greater.

It should be noted, however, that narrow gate acquisition, rather than wide gate acquisition, can be achieved. Using a narrow IF delay spacing, a sliding replica search may be employed, wherein the code DCO is adjusted to offset the frequency of the generated code from the frequency of the received code to cause the code phase of the generated code to vary in time with respect to the code phase of the received code in an acquisition mode. Thus, in an acquisition mode, the code DCO is adjusted to produce a PRN code in each corresponding channel at a chipping rate slightly higher than the expected nominal frequency of the received code. This will cause the generated code to progressively advance in phase with respect to the code phase of the received code. When the code phase advances to a point between the phase of the early IF signal and the late IF signal, gating is achieved. At that point, the generated code is set substantially equal to the frequency of the received code to maintain the generated code phase within the IF-delay correlation gate. Alternatively, the code DCO can be adjusted to produce a PRN code in each corresponding channel at a chipping rate slightly lower than the frequency of the received code. This will cause the received code to progressively advance in phase with respect to the code phase of the generated code. When the received code phase advances to a point where the generated code phase is between the phase of the early IF signal and the late IF signal, gating is achieved. At that point the generated code is set substantially equal to the frequency of the received code to maintain the generated code phase within the IF-delay correlation gate.

In an alternative configuration of the present invention, an additional adjustable delay device 150 may be introduced in the path of the IF signal to correlator 200, as shown in FIG. 5. This allows the IF input to correlator 200 to be adjustably delayed while maintaining selectively adjustable delay between the IF signal received by correlator 200 and the IF signal received by correlator 400. This would provide the additional ability to delay or advance the IF gate in time with respect to the generated code. The adjustable delays of delay devices 100 and 150 may be controlled by processor 510. Processor 510 is preferably the GPS microprocessor, implemented to also perform synchronization functions of synchronizer 500 and discriminator functions of discriminator 600, as described above.

Figure 6:
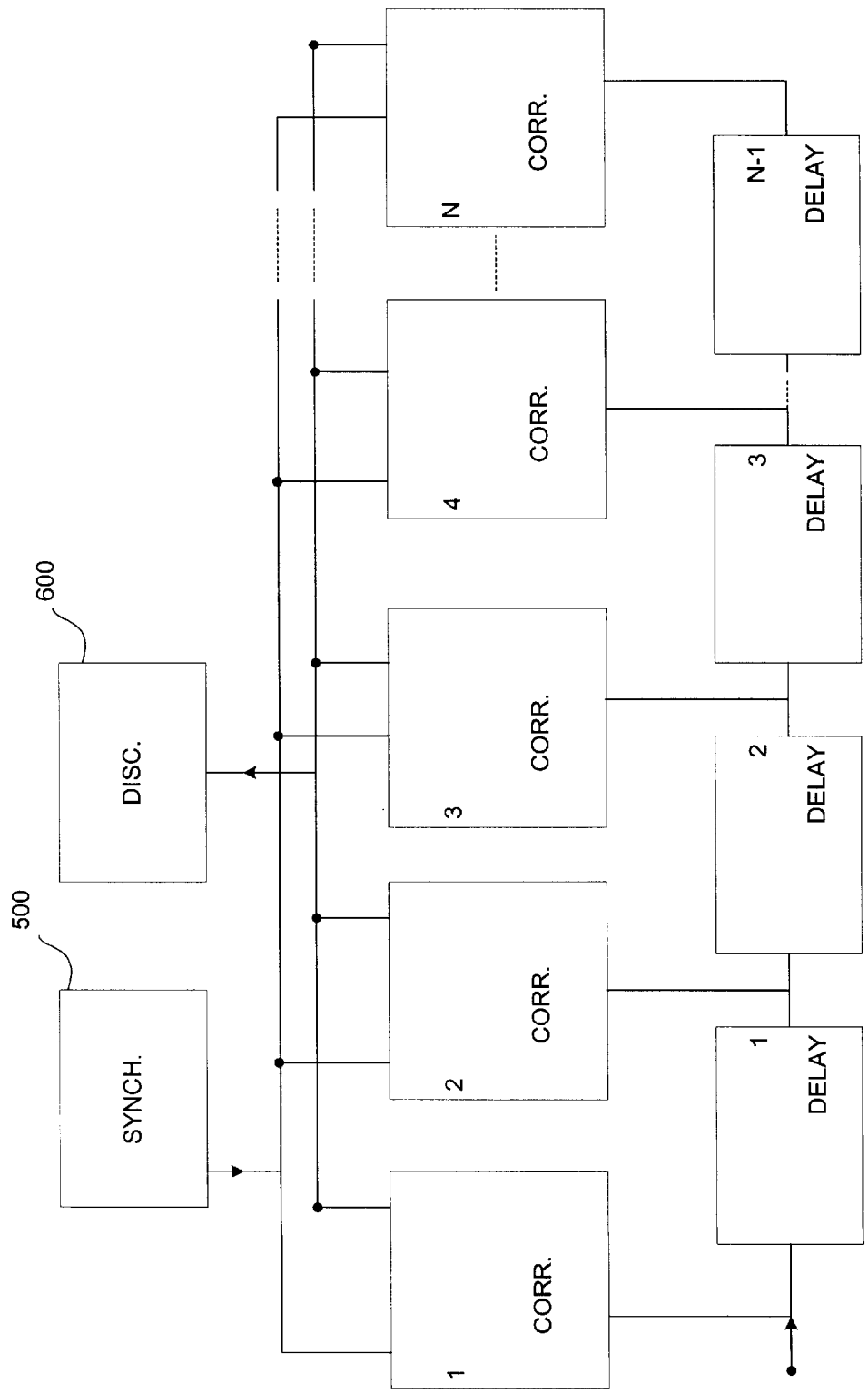
FIG. 6 is a block diagram of an alternative embodiment of the present invention for multiple point correlation.

An alternative embodiment of the present invention is shown in FIG. 6. The IF signal is input into a first correlator and is also input to a cascade of N−1 delay devices connected to N−1 correlators. The cascade of delay devices form a tapped delay line. The output of each delay device is a tap of the delay line that is input to one of the N−1 correlators.

Using commercially available, separately packaged correlators, all correlators would be synchronized by synchronizer 500, as previously described. Each corresponding channel of the N correlators that are to track the same satellite are commanded to produce identical PRN sequences that are substantially coincident in time. In an alternative embodiment, a single code generator and code DCO would provide the generated code to multiple correlators channels, and such a configuration could be packaged in a single integrated circuit.

Each correlator correlates the generated code with the IF signal it receives to produce N correlations. The power level of each correlation is proportional to the time delay between the IF signal received by the correlator and the generated code. The generated code may be adjusted so that the phase of the generated code leads the phase of the code received by the Nth correlator and lags the phase of the code received by the first correlator. Thus, the embodiment of FIG. 5 may be viewed as producing an early correlation point, a late correlation point, and N−2 correlation points therebetween. The signal may be acquired by the multiple correlation point tracking system using the sliding replica search described above, wherein the frequency of the generated PRN code is set higher or lower than the received code frequency during acquisition, and subsequently set substantially equal to the received code frequency during tracking.

If each delay device provides an identical time delay then the correlation points will be equally spaced. The delay produced by each delay device forming the tapped delay line may be selected to be substantially less than one code chip. The delay devices forming the tapped delay line may be implemented with D-type flip flops clocked by the sample clock of one of the N correlators, to produce equal delays of one sample clock period between each tap.

The multipoint correlation provides more information about the exact correlation between the received code and the generated code as a function of the time delay between them. Moreover, the N correlations can be used by discriminator 600 to construct a weighted average of correlations to produce a composite discriminator function from which a tracking error signal is derived. It is believed that correlation accumulations nearer to the correlation peak are less contaminated by multipath reflections and Gaussian noise sources, so that correlation accumulations nearer the correlation peak could be weighted more heavily than those further from the correlation peak, to provide a more accurate tracking error signal.

Clearly, changes can be made in the above-described details without departing from the underlying principles of the present invention. A description of a particular embodiment does not determine the scope of an invention. Rather, the scope of the present invention is determined by the following claims.

What is claimed is:

1. A narrow correlation system for tracking a signal encoded with one or more PRN codes, comprising:
    a code generator for generating a PRN code;
    a first correlator for correlating the encoded signal with the generated PRN code to produce a first correlation;
    a delay device for producing a delay of said encoded signal to produce a delayed signal;
    a second correlator for correlating the delayed signal with the generated PRN code to produce a second correlation.

2. The system of claim 1, wherein the delay produced by said delay device is adjustable to substantially less than one code chip.

3. The system of claim 1, wherein the time delay by which the encoded signal is delayed by said delay device is substantially less than one code chip.

4. The system of claim 1, further comprising a discriminator for deriving a tracking error signal from said first and second correlations.

5. The system of claim 2, wherein said delay produced by said delay device is adjusted to about one code chip or greater during an acquisition mode, and is subsequently adjusted to substantially less than one code chip during a tracking mode.

6. The system of claim 2, further comprising a second delay device for adjustably delaying the encoded signal prior to correlating said encoded signal by said first correlator.

7. The system of claim 3, wherein, during an acquisition mode, the frequency of said generated PRN code is offset from the frequency of a code with which the signal is encoded, and subsequently, during a tracking mode, the frequency of said generated PRN code is set substantially equal to the frequency of said code with which the signal is encoded.

8. A narrow correlation system for tracking a signal encoded with one or more PRN codes, comprising:
    a first correlator for correlating the encoded signal with a first PRN code generated by a first PRN code generator to produce a first correlation;
    a delay device for producing a delay of said encoded signal to produce a delayed signal;
    a second correlator for correlating the delayed signal with a second PRN code generated by a second PRN code generator to produce a second correlation;
    a synchronizer for synchronizing said first and second code generators to generate said first and second PRN codes to be sequences with substantially coincident epochs.

9. The system of claim 8, wherein the delay produced by said delay device is adjustable to substantially less than one code chip.

10. The system of claim 8, wherein the time delay by which the encoded signal is delayed by said delay device is substantially less than one code chip.

11. The system of claim 10, wherein the delay produced by said delay device is determined by the period of a sample clock of one of said correlators.

12. The system of claim 8, further comprising a discriminator for deriving a tracking error signal from said first and second correlations.

13. The system of claim 9, wherein said delay produced by said delay device is adjusted to about one code chip or greater during an acquisition mode, and is subsequently adjusted to substantially less than one code chip during a tracking mode.

14. A multiple point correlation system for tracking a signal encoded with one or more PRN codes, comprising:
    a code generator for generating a PRN code;
    a tapped delay line for forming a plurality of delayed signals from the encoded signal with a delay between each of said delayed signals;
    a plurality of correlators, each of said correlators correlating a different one of said delayed signals with the generated PRN code to produce a plurality of correlations.

15. The system of claim 14, wherein the delay between each of said delayed signals is substantially less than one code chip.

16. The system of claim 15, wherein the delay between each of said delayed signals is determined by a sample clock period of one of said correlators.

17. The system of claim 14, wherein, during an acquisition mode, the frequency of said generated PRN code is offset from the frequency of a code with which the signal is encoded, and subsequently, during a tracking mode, the frequency of said generated PRN code is set substantially equal to the frequency of said code with which the signal is encoded.

18. The system of claim 14, further comprising a discriminator for deriving a tracking error signal from said plurality of correlations.

19. The system of claim 18, wherein said tracking error signal is derived from a weighted average of said plurality of correlations.

20. A multiple point correlation system for tracking a signal encoded with one or more PRN codes, comprising:
    a tapped delay line for forming a plurality of delayed signals from the encoded signal with a delay between each of said delayed signals;
    a plurality of correlators, each correlating a different one of said delayed signals with a PRN code generated by each of said correlators to produce a plurality of correlations;
    a synchronizer for synchronizing said correlators to generate said generated PRN codes to be sequences with coincident epochs.

21. The system of claim 20, wherein the delay between each of said delayed signals is substantially less than one code chip.

22. The system of claim 20, further comprising a discriminator for deriving a tracking error signal from said plurality of correlations.

23. A method for narrow correlation tracking of a signal encoded with one or more PRN codes, comprising the steps of:
    generating a PRN code;
    correlating the encoded signal with said generated PRN code to produce a first correlation;
    producing a delay of said encoded signal to produce a delayed signal;
    correlating said delayed signal with said generated PRN code to produce a second correlation.

24. The method of claim 23, wherein the delayed signal is produced by delaying the encoded signal by a delay that is adjustable to substantially less than one code chip.

25. The method of claim 23, wherein the delayed signal is produced by delaying the encoded signal by a delay that is substantially less than one code chip.

26. The method of claim 23, further comprising the step of deriving a tracking error signal from said first and second correlations.

27. The method of claim 24, wherein said delay produced by said delay device is adjusted to about one code chip or greater during an acquisition mode, and is subsequently adjusted to substantially less than one code chip during a tracking mode.

28. The method of claim 24, further comprising the step of adjustably delaying the encoded signal prior to correlating said encoded signal by said first correlator.

29. The method of claim 25, wherein, during an acquisition mode, the frequency of said generated PRN code is offset from the frequency of a code with which the signal is encoded, and subsequently, during a tracking mode, the frequency of said generated PRN code is substantially equal to the frequency of said code with which the signal is encoded.

30. A method for narrow correlation tracking of a signal encoded with one or more PRN codes, comprising the steps of:

providing a first correlator channel which generates a first PRN code, and which further correlates the encoded signal with said first PRN code to produce a first correlation;

producing a delay of said encoded signal to produce a delayed signal;

providing a second correlator channel which generates a second PRN code, and which further correlates the delayed signal with said second PRN code to produce a second correlation;

synchronizing said first and second correlator channels to generate said first and second PRN codes to be sequences with substantially coincident epochs.

31. A method for multiple point correlation tracking of a signal encoded with one or more PRN codes, comprising:

generating a PRN code;

successively delaying the encoded signal to form a plurality of delayed signals with a delay between each of said delayed signals;

providing a plurality of correlators, each correlating a different one of said delayed signals with the same PRN code to produce a plurality of correlations.

32. The method of claim 31, wherein the delay between each of said delayed signals is substantially less than one code chip.

33. The method of claim 31, wherein, during an acquisition mode, the frequency of said generated PRN code is offset from the frequency of a code with which the signal is encoded, and subsequently, during a tracking mode, the frequency of said generated PRN code is set substantially equal to the frequency of said code with which the signal is encoded.

34. The method of claim 31, further comprising the step of deriving a tracking error signal from said plurality of correlations.

* * * * *